United States Patent [19]

Kashizaki

[11] Patent Number: 5,411,828
[45] Date of Patent: May 2, 1995

[54] ELECTROPHOTOGRAPHIC PHOTOSENSITIVE MEMBER, AND ELECTROPHOTOGRAPHIC APPARATUS, DEVICE UNIT AND FACSIMILE MACHINE HAVING THE PHOTOSENSITIVE MEMBER

[75] Inventor: Yoshio Kashizaki, Yokohama, Japan

[73] Assignee: Canon Kabushiki Kaisha, Tokyo, Japan

[21] Appl. No.: 13,734

[22] Filed: Feb. 4, 1993

[30] Foreign Application Priority Data

Feb. 5, 1992 [JP] Japan .................................. 4-047725

[51] Int. Cl.⁶ .......................................... G03G 15/02
[52] U.S. Cl. ........................................ 430/58; 430/59; 430/71; 430/72; 430/75; 430/76; 430/78; 430/79; 430/83; 355/211; 358/300
[58] Field of Search ................. 430/58, 66, 71, 73, 430/72, 75, 59, 83, 76, 78, 79; 355/211; 358/300

[56] References Cited

U.S. PATENT DOCUMENTS 4,868,080 9/1989 Umehara et al. ..................... 430/73
5,173,383 12/1992 Kashizaki et al. .................... 430/58
5,192,632 3/1993 Ohmura et al. ....................... 430/58

FOREIGN PATENT DOCUMENTS 47-37543 12/1972 Japan .
53-95033 8/1978 Japan .
54-79632 6/1979 Japan .
57-176055 10/1982 Japan .

*Primary Examiner*—S. Rosasco
*Attorney, Agent, or Firm*—Fitzpatrick, Cella, Harper & Scinto

[57] ABSTRACT

An electrophotographic photosensitive member is disclosed which has a photosensitive layer on a conductive support. The photosensitive layer contains an azo pigment of Formula (1):

$$Ar-(-N=N-Cp)_n.$$

Also, disclosed are an electrophotographic apparatus, a device unit, and a facsimile machine using the electrophotographic photosensitive member.

11 Claims, 1 Drawing Sheet

ELECTROPHOTOGRAPHIC PHOTOSENSITIVE MEMBER, AND ELECTROPHOTOGRAPHIC APPARATUS, DEVICE UNIT AND FACSIMILE MACHINE HAVING THE PHOTOSENSITIVE MEMBER

BACKGROUND OF THE INVENTION

1. Field of the Invention

The present invention relates to an electrophotographic photosensitive member. More particularly it relates to an electrophotographic photosensitive member having a photosensitive layer containing an azo pigment with a specific structure. The present invention is also concerned with an electrophotographic apparatus, a device unit and a facsimile machine that have such an electrophotographic photosensitive member.

2. Related Background Art

Hitherto known organic photoconductive materials used in electrophotographic photosensitive members include photoconductive polymers as typified by poly-N-vinylcarbazole and low-molecular organic photoconductive materials such as 2,5-bis(p-diethylaminophenyl)-1,3,4-oxadiazole, and also those comprising a combination of such organic photoconductive materials with all sorts of dyes or pigments.

The electrophotographic photosensitive members making use of the organic photoconductive materials have the advantages that they can achieve a very high productivity and are relatively inexpensive, and besides have the advantages such that wavelength regions to which they have sensitivity can be freely controlled by appropriately selecting dyes or pigments to be used. They accordingly have been studied extensively. In particular, the evolution of functionally separated photosensitive members comprising a lamination of a charge generation layer containing what is called charge-generating material such as an organic photoconductive dye or pigment and a charge transport layer containing a charge-transporting material has brought about a remarkable improvement in the sensitivity and durability to which conventional organic material electrophotographic photosensitive members have had a weakness.

Among the organic photoconductive materials, many of azo pigments are capable of showing superior photoconductivity. Moreover, compounds with a variety of properties can be relatively readily obtained according to the manner by which an azo component and a coupler component are combined. Thus, a large number of compounds have been hitherto proposed. As coupler components used in such azo pigments, the Naphthol AS compounds as disclosed in Japanese Patent Application Laid-open No. 47-37543, etc., the benzcarbazole compounds as disclosed in Japanese Patent Application Laid-open No. 53-95033, etc., the naphthalimide compounds as disclosed in Japanese Patent Application Laid-open No. 54-79632, and the perylene compounds as disclosed in Japanese Patent Application Laid-open No. 57-176055 are known in the art.

However, with a demand for higher image quality and higher durability in recent years, studies are made on a electrophotographic photosensitive member having a higher sensitivity and having a superior electrophotographic performance when repeatedly used.

SUMMARY OF THE INVENTION

An object of the present invention is to provide an electrophotographic photosensitive member having a photosensitive layer containing a novel organic photoconductive material.

Another object of the present invention is to provide an electrophotographic photosensitive member having a high sensitivity.

Still another object of the present invention is to provide an electrophotographic photosensitive member having stable potential characteristics when repeatedly used.

A further object of the present invention is to provide an electrophotographic apparatus, a device unit and a facsimile machine that have the above electrophotographic photosensitive member.

The present invention provides an electrophotographic photosensitive member comprising a conductive support and a photosensitive layer provided thereon, wherein said photosensitive layer contains an azo pigment represented by the following Formula (1).

Formula (1):

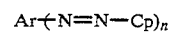

wherein Ar represents a substituted or unsubstituted aromatic hydrocarbon group which may be bonded through a linking group, or a substituted or unsubstituted heterocyclic group which maybe bonded through a linking group; Cp represents a coupler residual group having a phenolic hydroxyl group, at least one of said Cp representing a coupler residual group represented by the following Formula (2); and n represents an integer of 2 to 4;

Formula (2):

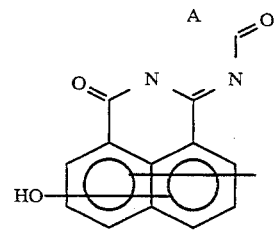

wherein A represents e divalent group of a substituted or unsubstituted aromatic hydrocarbon ring or a divalent group of a substituted or unsubstituted heterocyclic ring containing a nitrogen atom in the ring.

The present invention also provides an electrophotographic apparatus, e device unit end a facsimile machine that have the electrophotographic photosensitive member described above.

DESCRIPTION OF THE PREFERRED EMBODIMENTS

Figure 1:
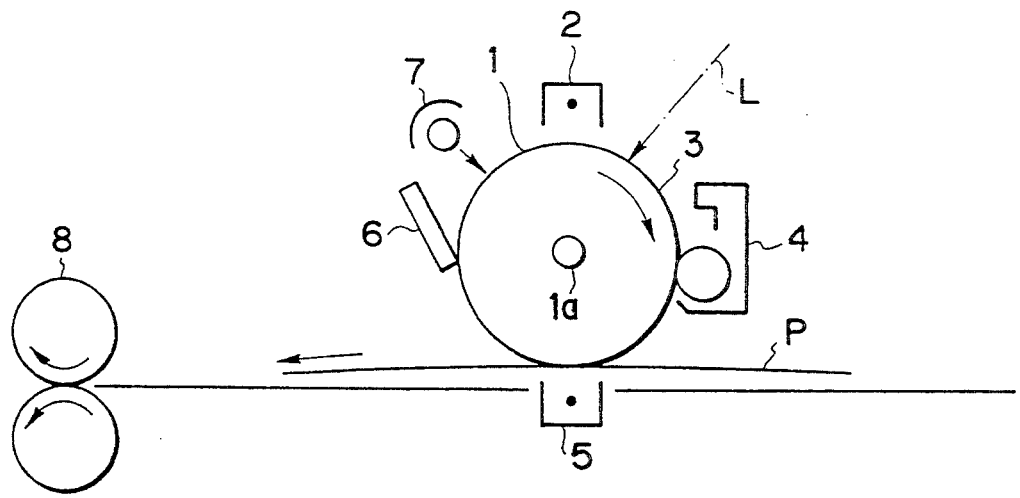
FIG. 1 schematically illustrates an example of the construction of an electrophotographic apparatus having the electrophotographic photosensitive member of the present invention.

The electrophotographic photosensitive member of the present invention has a photosensitive layer containing the azo pigment represented by the following Formula (1).

Formula (1):

$$Ar(-N=N-Cp)_n$$

wherein Ar represents a substituted or unsubstituted aromatic hydrocarbon group which may be bonded through a linking group, or a substituted or unsubstituted heterocyclic group which may be bonded through a linking group; Cp represents a coupler residual group having a phenolic hydroxyl group, at least one of said Cp representing a coupler residual group represented by the following Formula (2); and n represents an integer of 2 to 4.

Formula (2):

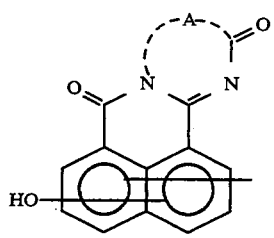

wherein A represents a divalent group of a substituted or unsubstituted aromatic hydrocarbon ring or a divalent group of a substituted or unsubstituted heterocyclic ring containing a nitrogen atom in the ring.

In Formula (1), the group represented by Ar includes, for example, aromatic hydrocarbon rings such as benzene, naphthalene, fluorene, phenanthrene, anthracene and pyrene; heterocyclic rings such as furan, thiophene, pyridine, indole, benzothiazole, carbazole, acridone, dibenzothiophene, benzoxazole, oxadiazole and thiazole; and the above aromatic hydrocarbon rings or heterocyclic rings bonded directly or through an aromatic group or non-aromatic group, as exemplified by groups such as biphenyl, binaphthyl, diphenylamine, triphenylamine, N-methyldiphenylamide, fluorenone, phenanthrenequinone, anthraquinone, benzanthrone, terphenyl, diphenyloxadiazole, stilbene, distyrylbenzene, azobenzene, azoxybenzene, phenylbenzoxazole, diphenylmethane, diphenylsulfone, diphenyl ether, benzophenone, tetraphenyl-p-phenylenediamine, tetraphenylbenzidine, N-phenyl-2-pyridylamine and N,N-diphenyl-2-pyridylamine.

A substituent that Ar may have includes alkyl groups such as methyl, ethyl, propyl and butyl; alkoxy groups such as methoxy, ethoxy and propoxy; halogen atoms such as fluorine, chlorine, iodine and bromine; dialkylamino groups such as dimethylamino and diethylamino; a hydroxyl group; a nitro group; a cyano group; and halomethyl groups.

In Formula (2), the group represented by A includes, for example, groups such as o-phenylene, 2,3-naphthylene, 2,3-pyrazin-di-yl, 3,4-pyrazol-di-yl, 2,3-pyridin-di-yl, 4,5-pyridin-di-yl and 4,5-imidazol-di-yl.

In the group represented by Cp in Formula (1), the coupler residual group that may also be present other than the coupler residual group represented by Formula (2) includes, for example, groups represented by the following Formulas (3) to (8).

Formula (3):

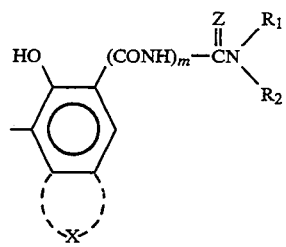

Formula (4):

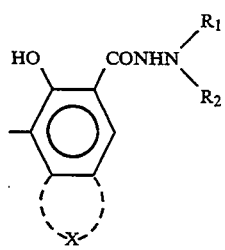

Formula (5):

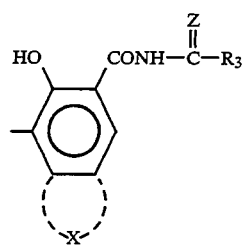

Formula (6):

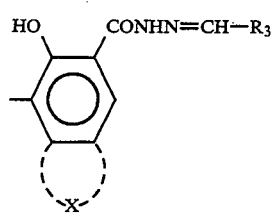

Formula (7):

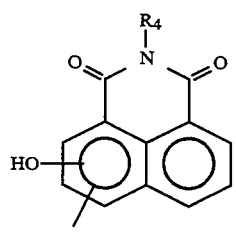

Formula (8):

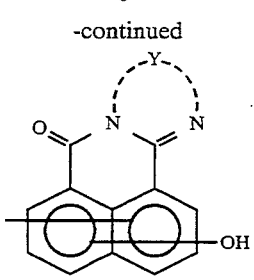

X in Formulas (3), (4), (5) and (6) represents a group of atoms necessary to combine with the benzene ring to form a substituted or unsubstituted aromatic ring or a substituted or unsubstituted heterocyclic ring, where the aromatic group and heterocyclic ring include, for example, a naphthalene ring, an anthracene ring, a carbazole ring, a benzcarbazole ring and a dibenzofuran ring. Y in Formula (8) represents a divalent group of a substituted or unsubstituted aromatic hydrocarbon ring or a divalent group of a substituted or unsubstituted heterocyclic ring containing a nitrogen atom in the ring, specifically including groups such as o-phenylene, o-naphthylene, perinapthylene, 1,2-anthrylene, 3,4-pyrazol-di-yl, 2,3-pyridin-di-yl, 4,5-pyridin-di-yl, 6,7-indazol-di-yl and 6,7-quinolin-di-yl. $R_1$ and $R_2$ in Formulas (3) and (4) each represent a hydrogen atom, a substituted or unsubstituted alkyl group, a substituted or unsubstituted aryl group, a substituted or unsubstituted aralkyl group or a substituted or unsubstituted heterocyclic group. $R_1$ and $R_2$ may also combine each other to form a substituted or unsubstituted cyclic amino group through the nitrogen atom. $R_3$ in Formulas (5) and (6) represents a hydrogen atom, a substituted or unsubstituted alkyl group, a substituted or unsubstituted aryl group, a substituted or unsubstituted aralkyl group or a substituted or unsubstituted heterocyclic group. $R_4$ in Formula (4) represents a hydrogen atom, a substituted or unsubstituted alkyl group, a substituted or unsubstituted aryl group, a substituted or unsubstituted aralkyl group or a substituted or unsubstituted heterocyclic group. The above alkyl group includes groups such as methyl, ethyl and propyl; the aryl group, groups such as phenyl, naphthyl and anthryl; the aralkyl group, groups such as benzyl and phenethyl; the heterocyclic group, groups such as pyridyl, thienyl, carbazolyl, benzimidazolyl and benzothiazolyl; and the cyclic amino group containing a nitrogen atom in the ring, groups such as pyrrole, pyrroline, pyrrolidine, pyrrolidone, indole, indoline, carbazole, imidazole, pyrazole, pyrazoline, oxazine and phenoxazine. The substituent includes halogen atoms such as fluorine, chlorine, iodine and bromine; alkyl groups such as methyl, ethyl and propyl; alkoxyl groups such as methoxy and ethoxy; alkylamino groups such as dimethylamino and diethylamino; a phenylcarbamoyl group; a nitro group; a cyano group; and halomethyl groups such as trifluoromethyl. Z in Formulas (3) and (5) represents an oxygen atom or a sulfur atom, and m represents 0 or 1.

Preferable examples of the azo pigment represented by Formula (1) of the present invention are shown below. The azo pigment used in the present invention is by no means limited to these. In the following, the specific structures of the exemplary pigments are each set forth by first giving a basic formula and subsequently its variations only.

The coupler having the coupler residual group represented by Formula (2) is, when synthesized as described later, usually obtained in the form of a mixture of isomers. Accordingly, its examples are also given in the form of mixtures. For example, in pigment 1, what is meant by "Basic formula 1: $Cp_1-N=N-Ar-N=N-Cp_2$ Pigment 1
Ar:
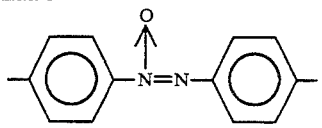

$Cp_1$ and $Cp_2$:
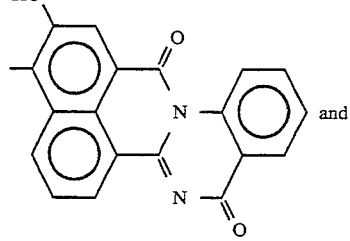 and

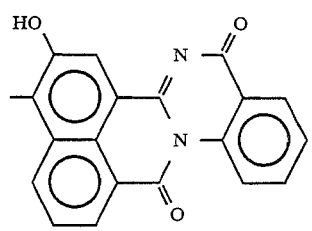

is that pigment 1 is a mixture of the compounds shown below.

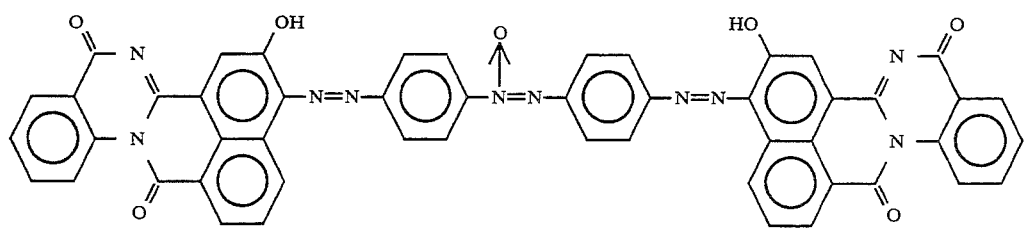

-continued
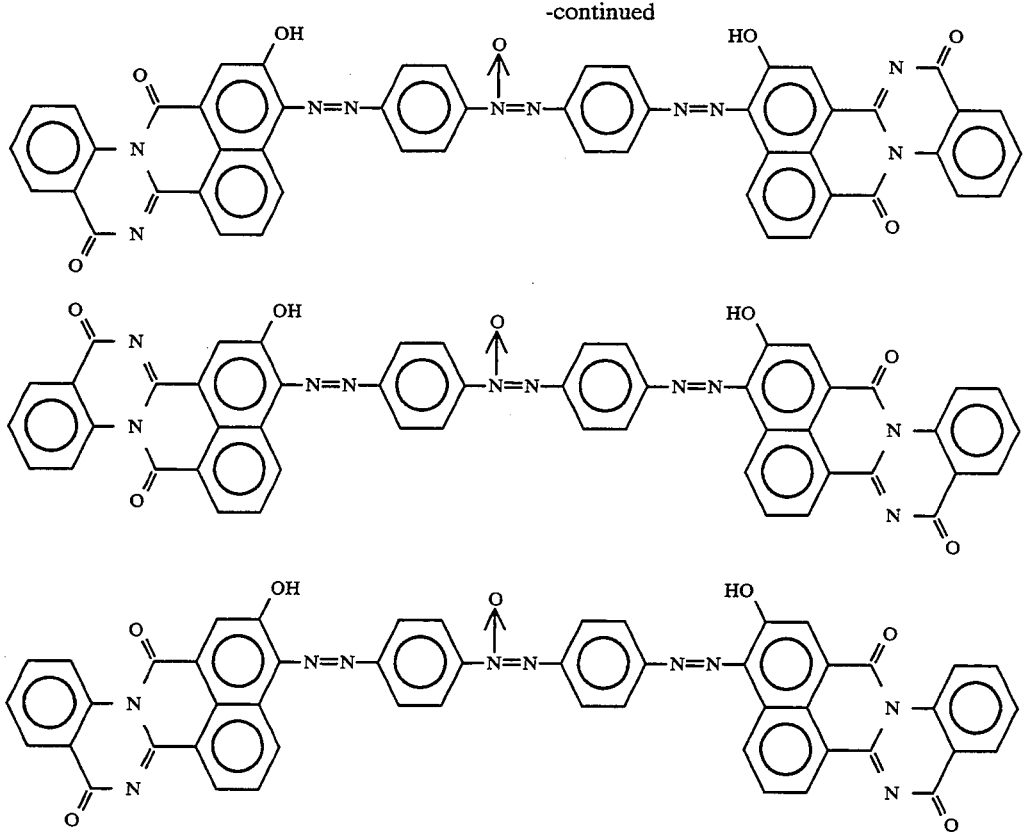
| Basic formula 1: $Cp_1-N=N-Ar-N=N-Cp_2$ |
|---|
Pigment 1
Ar:
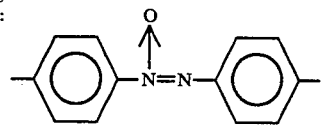
$Cp_1$ and $Cp_2$:
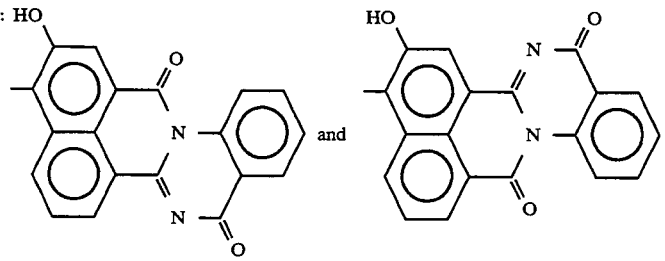
Pigment 2
Ar:
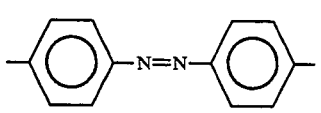
$Cp_1$ and $Cp_2$:
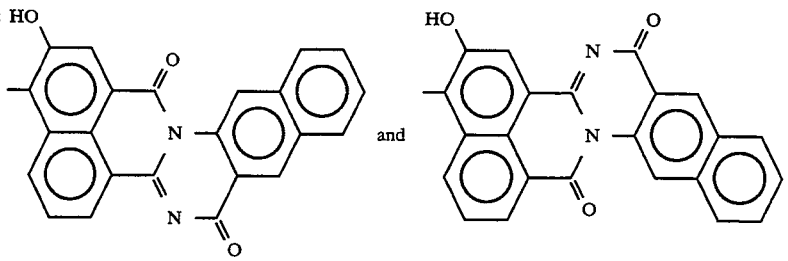

-continued
Basic formula 1: $Cp_1-N=N-Ar-N=N-Cp_2$
Pigment 3
Ar:
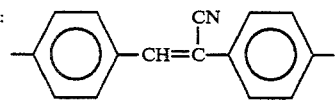
$Cp_1$ and $Cp_2$:
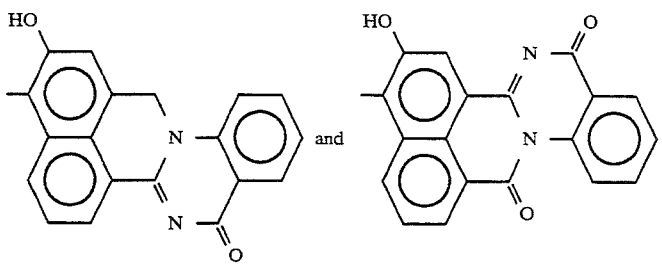
Pigment 4
Ar:
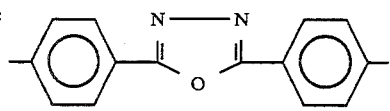
$Cp_1$ and $Cp_2$:
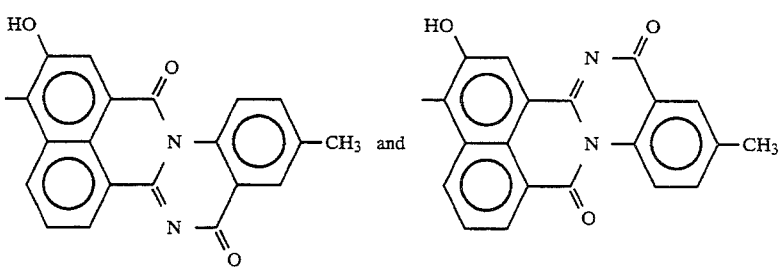
Pigment 5
Ar:
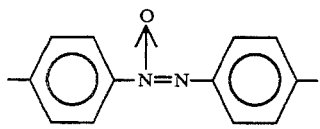
$Cp_1$ and $Cp_2$:
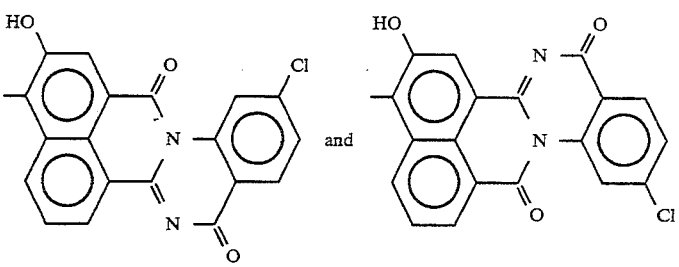
Pigment 6
Ar:
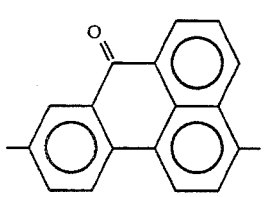

-continued
Basic formula 1: $Cp_1-N=N-Ar-N=N-Cp_2$
$Cp_1$ and $Cp_2$:
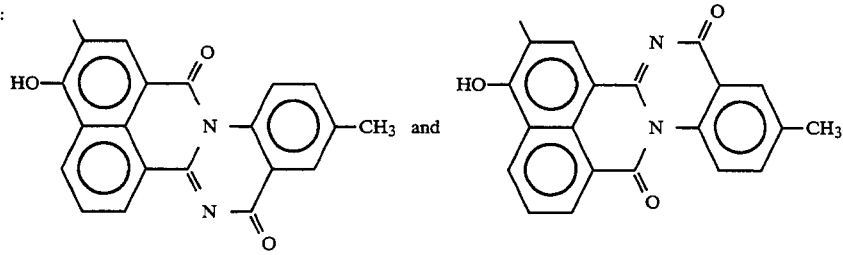
Pigment 7
Ar:
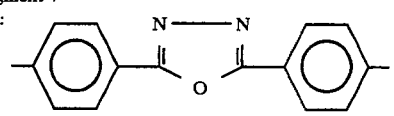
$Cp_1$:
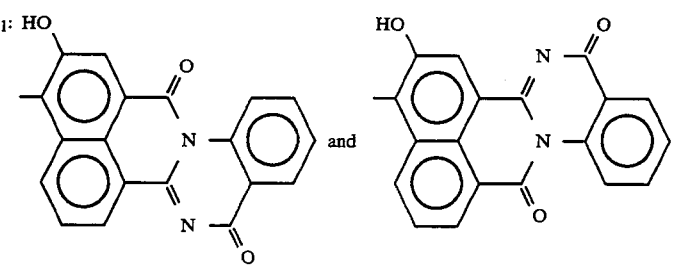
$Cp_2$:
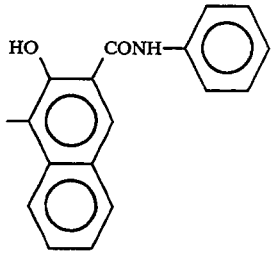
Pigment 8
Ar:
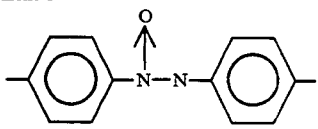
$Cp_1$:
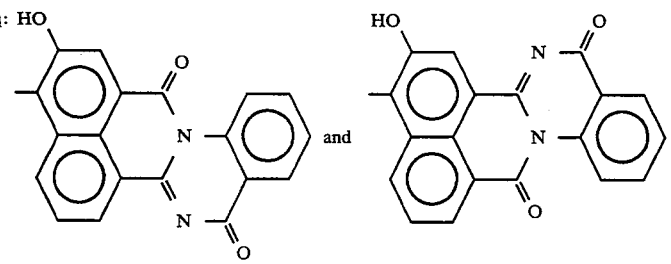
$Cp_2$:
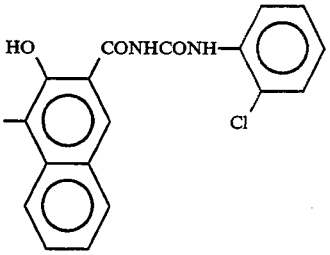

-continued
Basic formula 1: $Cp_1-N=N-Ar-N=N-Cp_2$
Pigment 9
Ar: 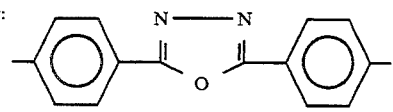
$Cp_1$: 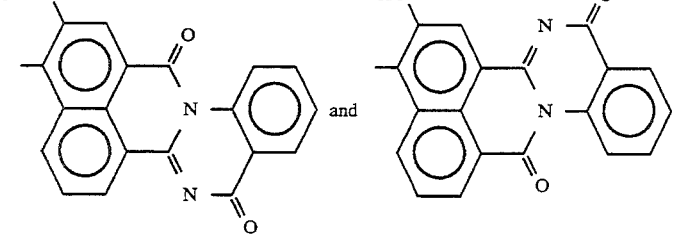
$Cp_2$: 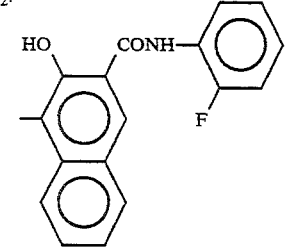
Pigment 10
Ar: 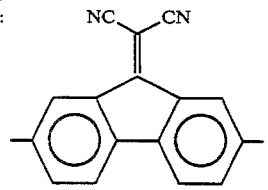
$Cp_1$: 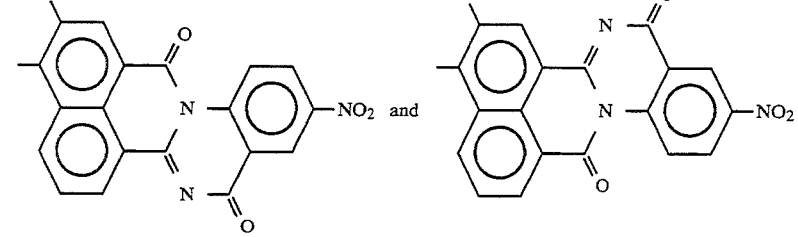
$Cp_2$: 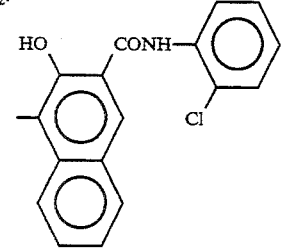
Pigment 11
Ar: 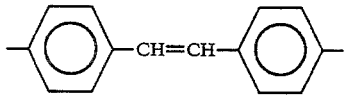

-continued
Basic formula 1: Cp₁—N=N—Ar—N=N—Cp₂
Cp₁:
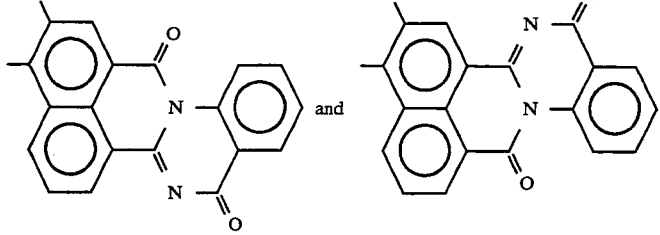 and
Cp₂:
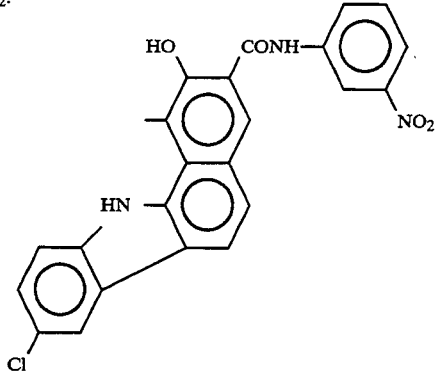
Pigment 12
Ar:
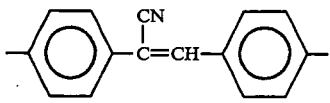
Cp₁:
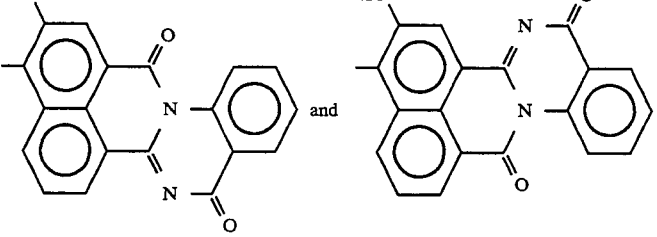 and
Cp₂:
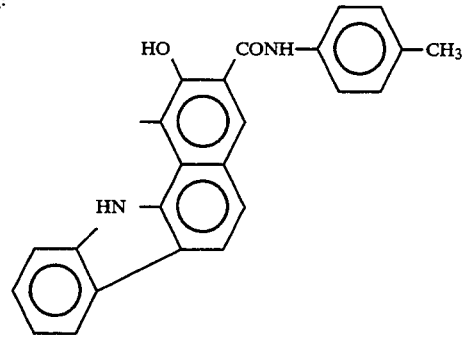
Pigment 13
Ar:
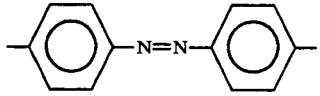

-continued
Basic formula 1: Cp₁—N=N—Ar—N=N—Cp₂
Cp₁:
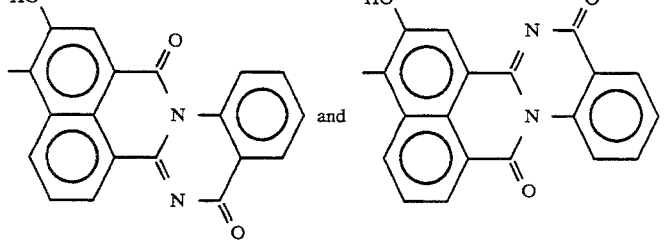
and
Cp₂:
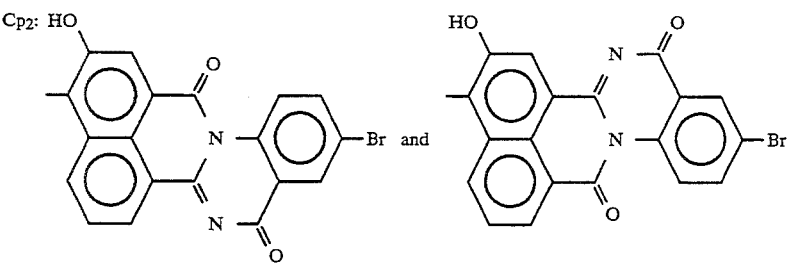
and
Pigment 14
Ar:
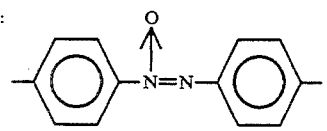
Cp₁:
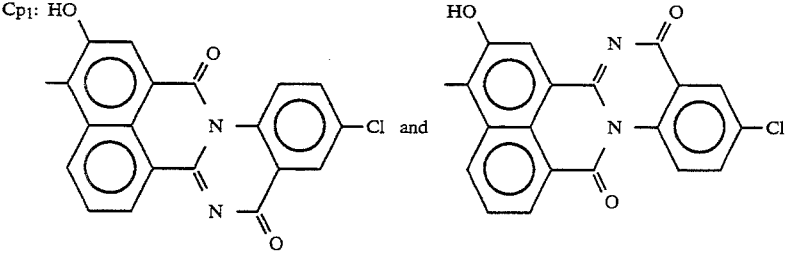
and
Cp₂:
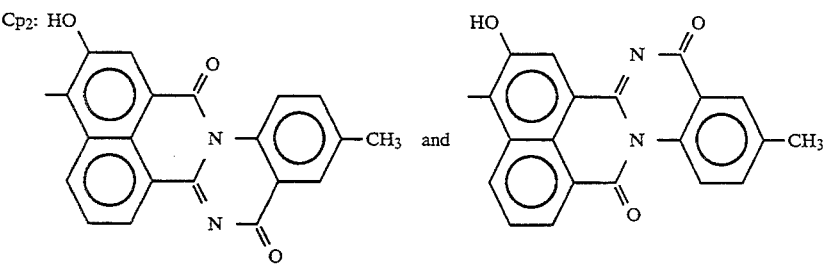
and
Pigment 15
Ar:
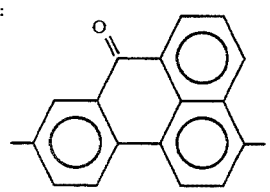

-continued
Basic formula 1: $Cp_1-N=N-Ar-N=N-Cp_2$
Cp₁: 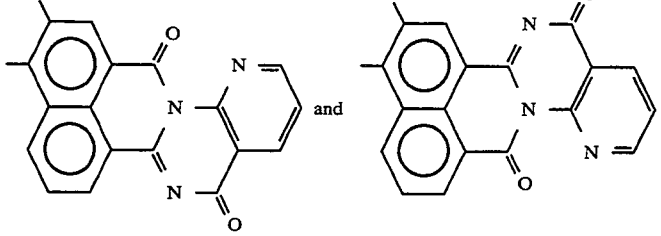 and
Cp₂: 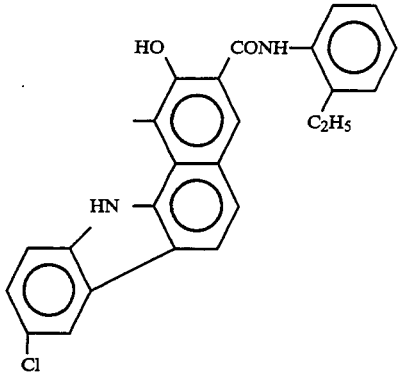
Pigment 16
Ar: 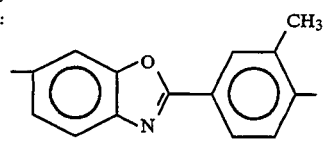
Cp₁: 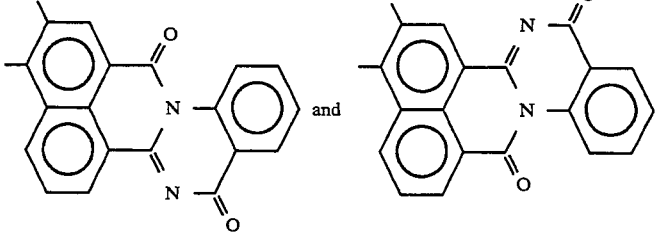 and
Cp₂: 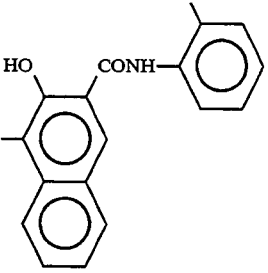
Pigment 17
Ar: 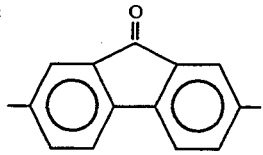

-continued
Basic formula 1: Cp$_1$—N=N—Ar—N=N—Cp$_2$
Cp$_1$: 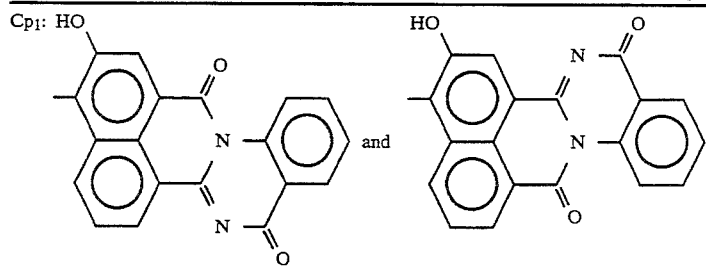 and
Cp$_2$: 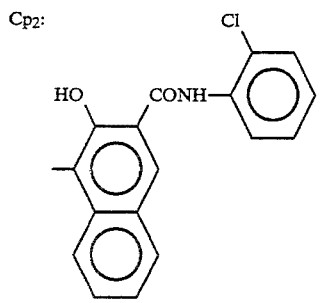
Pigment 18
Ar: 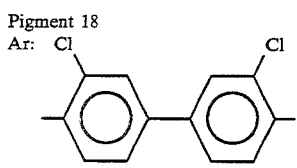
Cp$_1$: 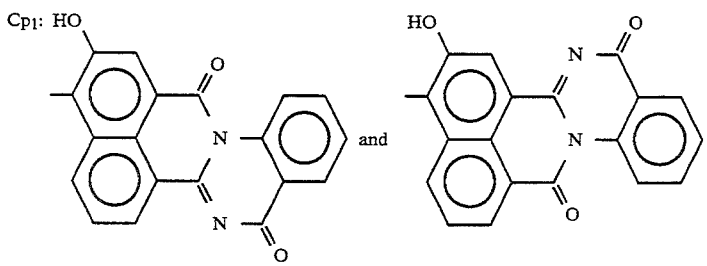 and
Cp$_2$: 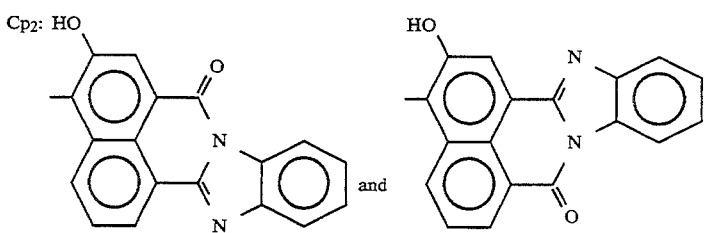 and
Pigment 19
Ar: 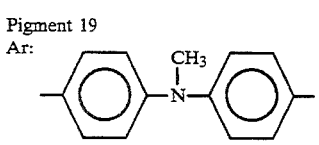
Cp$_1$: 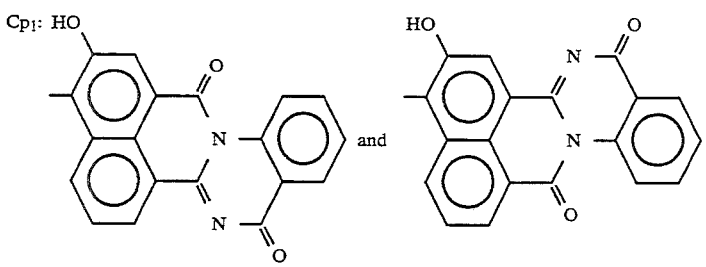 and -continued
Basic formula 1: $Cp_1-N=N-Ar-N=N-Cp_2$
$Cp_2$:
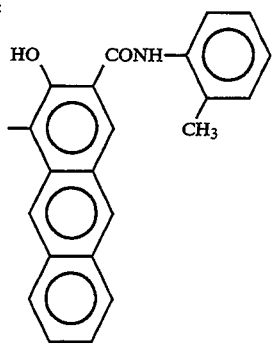
Pigment 20
Ar:
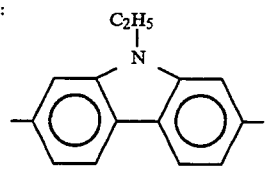
$Cp_1$:
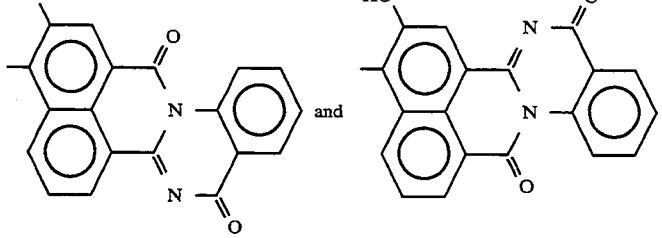
$Cp_2$:
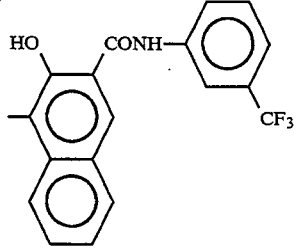
Pigment 21
Ar:
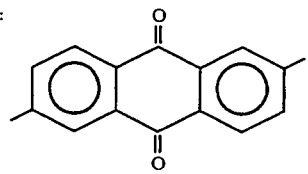
$Cp_1$:
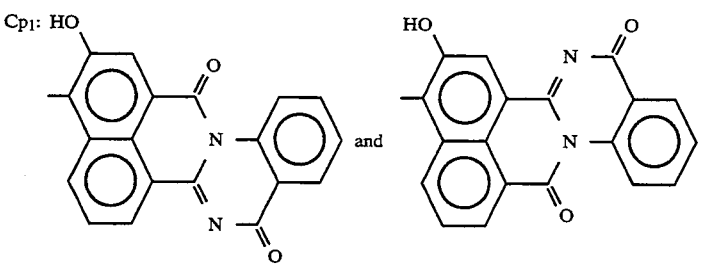

-continued
Basic formula 1: Cp₁—N=N—Ar—N=N—Cp₂
Cp₂:
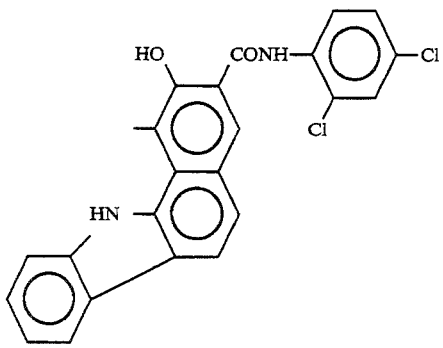
Basic formula 2: 
$$Cp_1-N=N-Ar\genfrac{}{}{0pt}{}{N=N-Cp_3}{N=N-Cp_2}$$
Pigment 22
Ar:
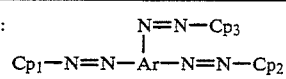
Cp₁, Cp₂ and Cp₃:
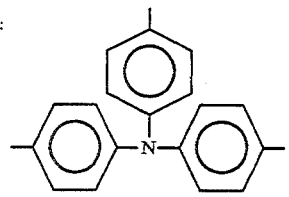 and 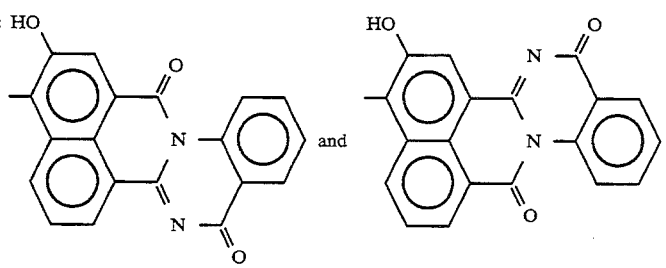
Pigment 23
Ar:
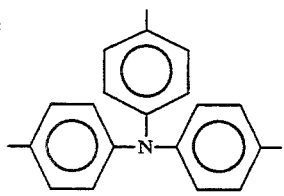
Cp₁, Cp₂ and Cp₃:
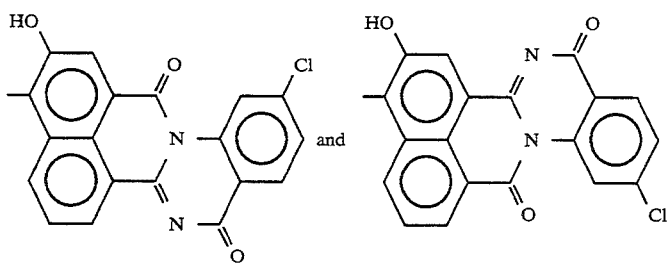
Pigment 24

-continued
Basic formula 2:
$$Cp_1-N=N-Ar-N=N-Cp_2$$
$$\hspace{2.5cm}|$$
$$\hspace{2.5cm}N=N-Cp_3$$
Ar:
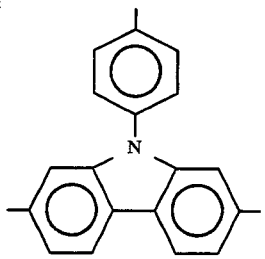
Cp₁, Cp₂ and Cp₃:
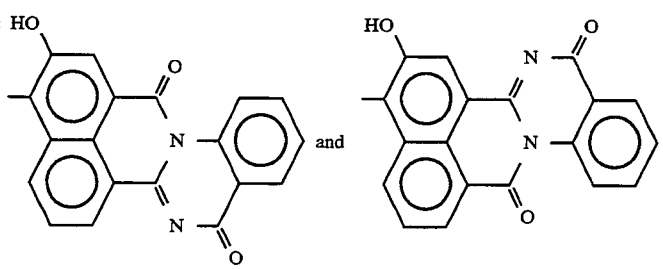
Basic formula 3:
$$Cp_1-N=N\hspace{1cm}N=N-Cp_3$$
$$\hspace{2cm}\diagdown Ar \diagup$$
$$Cp_2-N=N\hspace{1cm}N=N-Cp_4$$
Pigment 25
Ar:
Cp₁, Cp₂, Cp₃ and Cp₄:
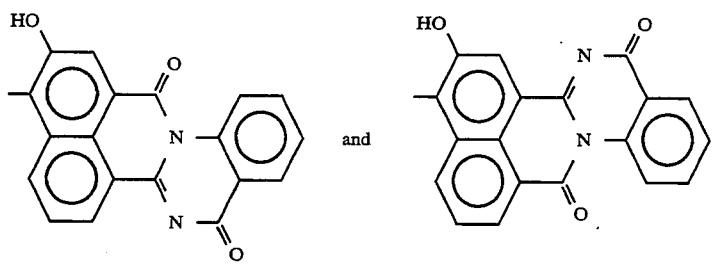
Pigment 26
Ar:
Cp₁, Cp₂, Cp₃ and Cp₄:

Basic formula 3:

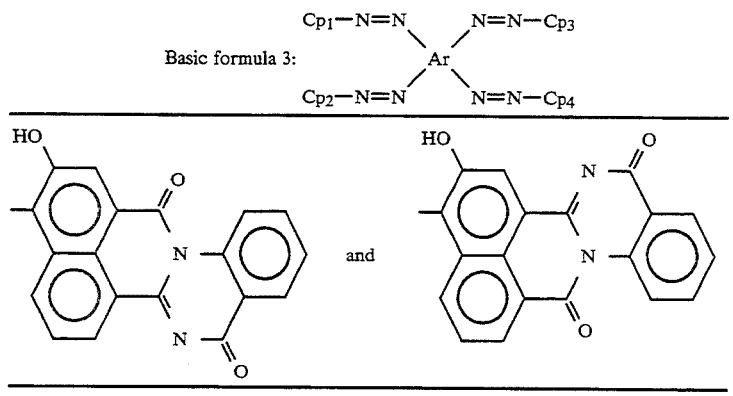

In the present invention, among these examples, the compounds in which all Cp's are coupler residual groups represented by Formula (2) are particularly preferred.

The coupler having the coupler residual group represented by Formula (2) can be synthesized by subjecting 3-hydroxy-1,8-naphthalic acid anhydride and the corresponding aminoarylcarboxylic acid amide to dehydration condensation in a suitable solvent. The solvent used includes nitrobenzene, dichlorobenzene, trichlorobenzene and xylene. Phosphorus oxychloride or polyphosphoric acid may be added as a condensation agent. The coupler having the coupler residual group represented by Formula (2), thus synthesized, is obtained in the form of a mixture of isomers represented by the following Formulas (2-a) and (2-b). Either isomer can be used in the present invention.

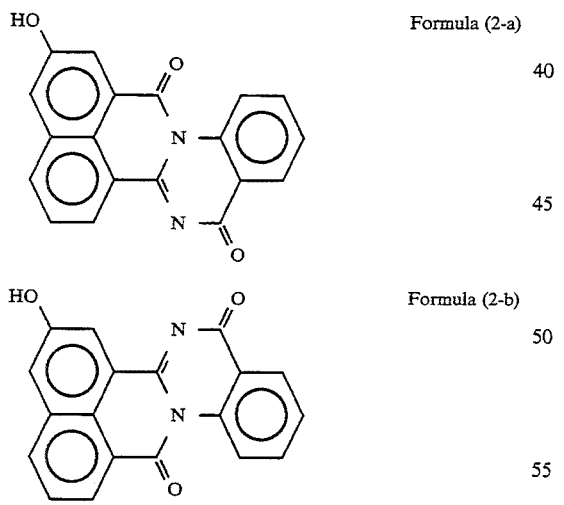

Formula (2-a)

Formula (2-b)

Synthesis Example 1 (Synthesis of coupler)

To 130 ml of nitrobenzene, 10.0 g of 3-hydroxy-1,8-naphthalic acid anhydride and 7.0 g of o-aminobenzamide were added to carry out reflux with heating for 12 hours. After the reaction mixture was left to cool, the precipitate was filtered, and dispersed and washed with toluene and then with methanol, followed by reprecipitation repeated twice using an N,N-dimethylformamide/methanol solution. Thereafter, the precipitate was again dispersed and washed with methanol, followed by drying to give 3.5 g of a mixture of the couplers represented by Formulas (2-a) and (2-b). m.p.: 310°–315° C.; mass spectrum: m/z=314.

The azo pigment represented by Formula (1) can be readily obtained by;

(a) converting the corresponding amine into a diazo form, followed by coupling with the coupler having the coupler residual group represented by Formula (2), in the presence of an alkali in an aqueous system; or (b) converting a diazonium salt into a boron fluoride or a zinc chloride complex, followed by coupling with the coupler in the presence of a base such as sodium acetate, triethylamine or N-methylmorpholine in an organic solvent such as N,N-dimethylformamide or dimethylsulfoxide. When disazo pigments in which a coupler residual group other than the coupler residual group represented by Formula (2) is present together in the molecule are synthesized, they can be synthesized by;

(a) subjecting 1 mol of a tetrazolium salt fistly to coupling with 1 mol of the coupler having the coupler residual group represented by Formula (2) and subsequently to coupling with 1 mol of other coupler; or (b) converting a diamine one amino group of which has been protected with an acetyl group or the like, into a diazo form, followed by coupling with the coupler having the coupler residual group represented by Formula (2), thereafter hydrolyzing the protective group using hydrochloric acid or the like, and again converting the compound into a diazo form, followed by coupling with the coupler. Trisazo pigments and tetrakisazo pigments in which a coupler residual group other than the coupler residual group represented by Formula (2) is present together in the molecule can also be synthesized in the same manner.

Synthesis Example 2 (Synthesis of pigment 1)

In 300 ml of a beaker, 150 ml of water, 20 ml (0.23 mol) of concentrated hydrochloric acid and 7.3 g (0.032 mol) of the following diamine compound

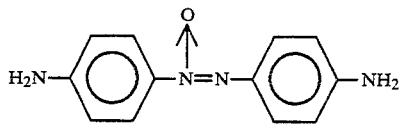

were put, and the mixture was cooled to 0° C., to which a solution prepared by dissolving 4.6 g (0.067 mol) of sodium nitrite in 10 ml of water was dropwise added in 10 minutes while its liquid temperature was kept at 2° C. or less. After stirring for 15 minutes, the reaction mixture was filtered with carbon, and then a solution prepared by dissolving 10.5 g (0.096 mol) of sodium borofluoride in 90 ml of water was dropwise added in the reaction mixture with stirring. The borofluoride precipitated was collected by filtration, and then washed with cold water, followed by washing with acetonitrile and then drying at room temperature under reduced pressure. Yield: 12.8 g, 94%.

Next, in a 5 lit beaker, 3 lit. of DMF (N,N-dimethylformamide) was put, and then 13.2 g (0.042 mol) of a mixture of the couplers represented by Formulas (2-a) and (2-b) was dissolved therein by heating. The resulting solution was cooled to have a liquid temperature of 5° C. Thereafter, 8.5 g (0.020 mol) of the borofluoride previously obtained was dissolved therein and subsequently 5.1 g (0.050 mol) of triethylamine was dropwise added in 5 minutes. After stirring for 2 hours, the pigment precipitated was collected by filtration, and then washed with DMF four times and with water three times, followed by freeze-drying. Yield: 14.2 g, 81%.

The electrophotographic photosensitive member of the present invention comprises a conductive support having thereon a photosensitive layer containing the azo pigment represented by Formula (1). The photosensitive layer may have any known form. Particularly preferred is a photosensitive layer of a function-separated type, comprised of a charge generation layer containing the azo pigment represented by Formula (1) and a charge transport layer laminated thereon containing a charge-transporting material.

The charge generation layer can be formed by depositing the azo pigment of the present invention on a conductive support, or by coating on a conductive support by a known method a coating solution prepared by dispersing the azo pigment in a suitable solvent together with a binder resin. The layer may preferably be formed in a thin layer having a thickness of not more than 5 μm, and particularly preferably from 0.1 to 1 μm. The binder resin used in the formation of this layer can be selected from a vast range of insulating resins or organic photoconductive polymers. It may preferably include polyvinyl butyral, polyvinyl benzal, polyallylates, polycarbonates, polyesters, phenoxy resins, cellulose resins, acrylic resins and polyurethanes. It may be used in an amount of not more than 80 parts by weight, and particularly preferably not more than 40 parts by weight, based on the total weight of the charge generation layer. The solvent used may preferably be selected from those which dissolve the above resin and do not dissolve the charge transport layer and subbing layer described later. It may specifically includes ethers such as tetrahydrofuran and 1,4-dioxane; ketones such as cyclohexanone and methyl ethyl ketone; amides such as N,N-dimethylformamide; esters such as methyl acetate and ethyl acetate; aromatics such as toluene, xylene and monochlorobenzene; alcohols such as methanol, ethanol and 2-propanol; and aliphatic halogenated hydrocarbons such as chloroform, methylene chloride, dichloroethylene, carbon tetrachloride and trichloroethylene.

The charge transport layer is laminated on or beneath the charge generation layer, and can be formed by coating a coating solution prepared by dissolving a charge-transporting material in a solvent optionally together with a suitable binder resin. It may preferably have a layer thickness of from 5 to 40 μm, and particularly preferably from 15 to 30 μm.

The charge-transporting material can be roughly grouped into an electron transporting material and a hole transporting material. The electron transporting material includes electron attractive materials as exemplified by 2,4,7-trinitrofluorenone, 2,4,5,7-tetranitrofluorenone, chloroanil and tetracyanoquinodimethane, or those obtained by forming these electron attractive materials into polymers. The hole transporting material includes polycyclic aromatic compounds such as pyrene and anthracene; heterocyclic compounds such as compounds of a carbazole type, an indole type, an imidazole type, an oxazole type, a thiazole type, an oxadiazole type, a pyrazole type, a pyrazoline type, a thiadiazole type or a triazole type; hydrazone compounds such as p-diethylaminobenzaldehyde-N,N-diphenylhydrazone and N,N-diphenylhydrazino-3-methylidene-9-ethylcarbazole; triarylamine compounds such as tri-p-tolylamine, 4-(di-p-tolylamino)-biphenyl, 2-(di-p-tolyl)-amino-9,9'-dimethylfluorenone and 1-di-p-tolyl-aminopyrene; styryl compounds such as α-phenyl-4'-N,N-diphenylaminostilbene and 5-[4-(di-p-tolylamino)benzylidene]-5H-dibenzo[a,d]cycloheptene; benzidine compounds; triarylmethane compounds; triphenylamine compound; or polymers having a group comprising any of these compounds as a backbone chain or side chain as exemplified by poly-N-vinylcarbazole and polyvinylanthracene. In addition to these organic charge-transporting materials, it is also possible to use inorganic materials such as selenium, selenium-tellurium, amorphous silicon and cadmium sulfide. These charge-transporting materials can be used alone or in combination of two or more kinds.

A binder resin may be used when the charge-transporting material has no film forming properties. It may specifically include insulating resins such as acrylic resins, polyallylates, polyesters, polycarbontes, polystyrene, an acrylonitrile/styrene copolymer, polyacrylamides polyamides and chlorinated rubbers; and organic photoconductive polymers such as poly-N-vinylcarbazole and polyvinylanthracene.

The conductive support used in the present invention are exemplified by those made of aluminum, an aluminum alloy, copper, zinc, stainless steel, vanadium, molybdenum, chromium, titanium, nickel, indium, gold and platinum. Besides, it is possible to use supports comprised of plastics (as exemplified by polyethylene, polypropylene, polyvinyl chloride, polyethylene terephthalate and acrylic resins) having a film formed by vacuum deposition of any of these metals or alloys, supports comprising any of the above plastics, metals or alloys covered thereon with conductive particles (as exemplified by carbon black and silver particles) together with a suitable binder, and supports comprising plastics or paper impregnated with the conductive particles. The support may be in the form of a drum, a sheet or a belt, and should preferably be made to have a form most suited for electrophotographic apparatus to which it is applied.

In the present invention, a subbing layer having a barrier function and an adhesion function may be provided between the conductive support and the photosensitive layer. The subbing layer can be formed using casein, polyvinyl alcohol, nitrocellulose, polyamides such as nylon 6, nylon 66, nylon 610, copolymer nylon and alkoxymethylated nylon, polyurethanes, aluminum oxide, etc. The subbing layer may preferably have a layer thickness of not more than 5 μm, preferably from 0.1 μm to 3 μm.

As another embodiment of the present invention, the electrophotographic photosensitive member may include those having a photosensitive layer in which the azo pigment of the present invention and the charge-transporting material as described above are incorporated in the same layer. In this instance, a charge-transfer complex comprised of poly-N-vinylcarbazole and, trinitrofluorenone can be used as the charge-transporting material. The electrophotographic photosensitive member of this embodiment can be formed by coating a solution prepared by dissolving in a suitable resin solution the azo pigment of the present invention and the charge-transporting material or charge-transfer complex as described above.

In both the electrophotographic photosensitive members, the azo pigment represented by Formula (1) may be either amorphous or crystalline in its crystal form. If necessary, the azo pigment represented by Formula (1) may also be used in combination of two or more kinds, or in combination of a known charge-generating material.

In the present invention, it is possible to further provide on the photosensitive layer a protective layer mainly composed of a resin.

The electrophotographic photosensitive member of the present invention can be not only utilized in electrophotographic copying machines, but also widely used in the field in which the electrophotography is applied as exemplified by laser beam printers, CRT printers, LED printers, liquid crystal printers, laser beam engravers and facsimile machines.

The electrophotographic apparatus, device unit and facsimile machine having the electrophotographic photosensitive member of the present invention will be described below.

FIG. 1 schematically illustrates the construction of an electrophotographic apparatus in which the electrophotographic photosensitive member of the present invention is used. In FIG. 1, the numeral 1 denotes a drum photosensitive member serving as an image bearing member, which is rotated around a shaft 1a at a given peripheral speed in the direction shown by an arrow. In the course of rotation, the photosensitive member 1 is uniformly charged on its periphery, with positive or negative given potential by the operation of a charging means 2, and then photoimagewise exposed to light L (slit exposure, laser beam scanning exposure, etc.) at an exposure zone 3 by the operation of an imagewise exposure means (not shown). As a result, electrostatic latent images corresponding to the exposed images are successively formed on the periphery of the photosensitive member.

The electrostatic latent images thus formed are subsequently developed by toner by the operation of a developing means 4. The resulting toner-developed images are then successively transferred by the operation of a transfer means 5, to the surface of a transfer medium P fed from a paper feed section (not shown) to the part between the photosensitive member 1 and the transfer means 5 in the manner synchronized with the rotation of the photosensitive member 1.

The transfer medium P on which the images have been transferred is separated from the surface of the photosensitive member and led through an image-fixing means 8, where the images are fixed and then delivered to the outside as a transcript (a copy).

The surface of the photosensitive member 1 after the transfer of images is brought to removal of the toner remaining after the transfer, using a cleaning means 6. Thus the photosensitive member is cleaned on its surface. Further, the charges remaining thereon are eliminated by the operation of a pre-exposure means 7. The photosensitive member is then repeatedly used for the formation of images.

The charging means 2 for giving uniform charge on the photosensitive member 1 include corona chargers, which are commonly put into wide use. As the transfer means 5, corona transfer units are also commonly put into wide use.

In the present invention, the electrophotographic apparatus may be constituted of a combination of plural components joined as one device unit from among the constituents such as the above photosensitive member, developing means and cleaning means so that the unit can be freely mounted on or detached from the body of the apparatus. For example, at least one of the charging means 2, the developing means 4 and the cleaning means 6 may be held into one device unit together with the photosensitive member so that the unit can be freely mounted or detached using a guide means such as a rail provided in the body of the apparatus.

In the case when the electrophotographic apparatus is used as a copying machine or a printer, the photosensitive member is exposed to optical image exposing light L by Irradiation with light reflected from, or transmitted through, an original, or the photosensitive member is exposed to light by the scanning of a laser beam, the driving of an LED array or the driving of a liquid crystal shutter array according to signals obtained by reading an original with a sensor and converting the information into signals.

Figure 2:
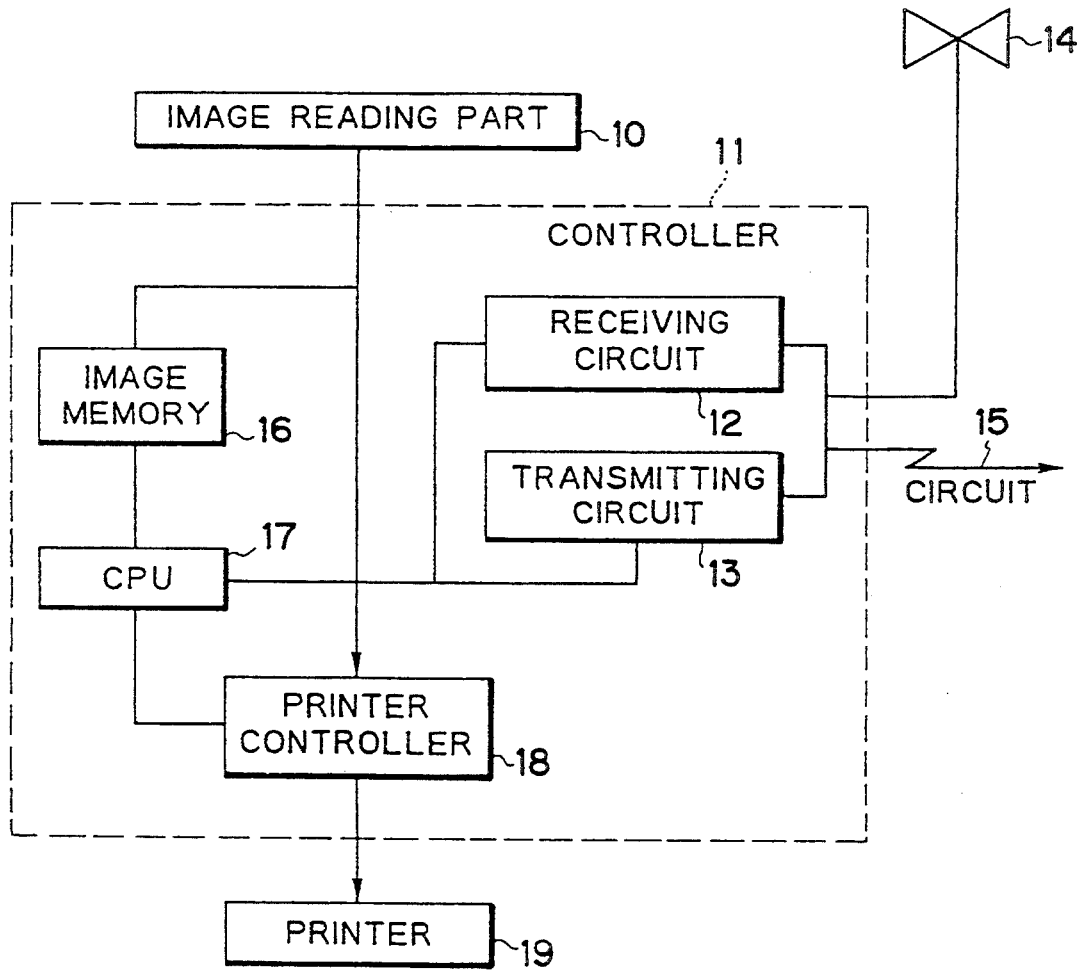
FIG. 2 is a block diagram of a facsimile machine in which an electrophotographic apparatus having the electrophotographic photosensitive member of the present invention is used.

When used as a printer of a facsimile machine, the optical image exposing light L serves as exposing light used for the printing of received data. FIG. 2 illustrates an example thereof in the form of a block diagram.

In FIG. 2, a controller 11 controls an image reading part 10 and a printer 19. The whole of the controller 11 is controlled by CPU 17. Image data outputted from the image reading part is sent to the other facsimile station through a transmitting circuit 13. Data received from the other station is sent to a printer 19 through a receiving circuit 12. Given image data are stored in an image memory 16. A printer controller 18 controls the printer 19. The numeral 14 denotes a telephone.

An image received from a circuit 15 (image information from a remote terminal connected through the circuit) is demodulated in the receiving circuit 12, and then successively stored in an image memory 16 after the image information is decoded by the CPU 17. Then, when images for at least one page have been stored in the memory 16, the image recording for that page is carried out. The CPU 17 reads out the image information for one page from the memory 16 and sends the coded image information for one page to the printer controller 18. The printer controller 18, having received the image information for one page from the CPU 17, controls the printer 19 so that the image information for one page is recorded.

The CPU 17 receives image information for next page in the course of the recording by the printer 19.

Images are received and recorded in the above way.

EXAMPLES

Examples 1 to 26

To an aluminum support, a solution prepared by dissolving 5 g of methoxymethylated nylon (weight average molecular weight: 32,000) and 10 g of alcohol-soluble copolymer nylon (weight average molecular weight: 29,000) in 95 g of methanol was applied by Meyer bar coating to form a subbing layer of 1 μm in a dried coating thickness.

Next, 5 g of pigment 1 was added to a solution prepared by dissolving 2 g of polyvinyl benzal (degree of benzalation: 75% or more) in 95 g of cyclohexanone, followed by dispersion for 20 hours using a sand mill. The resulting dispersion was applied onto the subbing layer previously formed, by Meyer bar coating so as to have a dried coating thickness of 0.2 μm, followed by drying to form a charge generation layer.

Next, 5 g of a triarylamine compound represented by the formula:

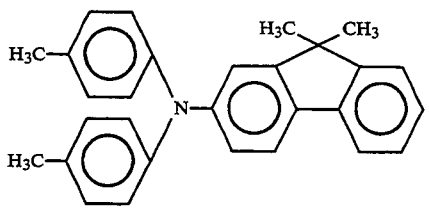

and 5 g of polymethyl methacrylate (weight average molecular weight: 100,000) were dissolved An 40 ml of chlorobenzene, and the resulting solution was applied onto the charge generation layer by Meyer bar coating so as to have a dried coating thickness of 20 μm, followed by drying to form a charge transport layer. An electrophotographic photosensitive member of Example 1 was thus produced.

Electrophotographic photosensitive members corresponding to Examples 2 to 26 were produced in the same manner as in Example 1 except that the pigment 1 was respectively replaced with the pigments as shown in Table 1.

The electrophotographic photosensitive members thus produced were negatively charged by corona discharge under −5 kV using an electrostatic copy paper test machine (Model SP-428, manufactured by Kawaguchi Denki K. K.), and then kept in the dark for 1 second, followed by exposure to light with illuminance of 10 lux using a halogen lamp to examine their charge characteristics. As the charge characteristics, the surface potential ($V_0$) and the amount of exposure, i.e., sensitivity ($E_{\frac{1}{2}}$) required for decaying to $\frac{1}{2}$ the surface potential (dark portion potential: $V_D$) after the dark-decaying for 1 second were measured.

Results obtained are shown in Table 1.

TABLE 1

| Example | Pigment No. | $V_0$ (−V) | $E_{\frac{1}{2}}$ (lux · sec) |
|---|---|---|---|
| 1 | 1 | 680 | 2.1 |
| 2 | 2 | 690 | 2.3 |
| 3 | 3 | 672 | 2.5 |
| 4 | 4 | 685 | 3.3 |
| 5 | 5 | 675 | 2.5 |
| 6 | 6 | 702 | 2.1 |
| 7 | 7 | 685 | 2.0 |
| 8 | 8 | 693 | 1.6 |
| 9 | 9 | 695 | 2.5 |
| 10 | 10 | 700 | 2.5 |
| 11 | 11 | 675 | 1.8 |
| 12 | 12 | 663 | 2.1 |
| 13 | 13 | 685 | 2.3 |
| 14 | 14 | 689 | 1.7 |
| 15 | 15 | 690 | 2.8 |
| 16 | 16 | 710 | 2.3 |
| 17 | 17 | 715 | 1.7 |
| 18 | 18 | 705 | 2.8 |
| 19 | 19 | 678 | 3.9 |
| 20 | 20 | 685 | 4.8 |
| 21 | 21 | 695 | 4.5 |
| 22 | 22 | 695 | 4.8 |
| 23 | 23 | 700 | 4.6 |
| 24 | 24 | 720 | 4.9 |
| 25 | 25 | 715 | 3.6 |
| 26 | 26 | 700 | 2.0 |

Comparative Examples 1 to 5

Electrophotographic photosensitive members were produced in the same manner as in Example 1 except that the azo pigment used in Example 1 was replaced with the following comparative pigments 1 to 5. Evaluation was similarly made.

Results obtained are shown in Table 2. Comparative pigment 1 to 4:

Basic formula: Ar—N=N—Cp

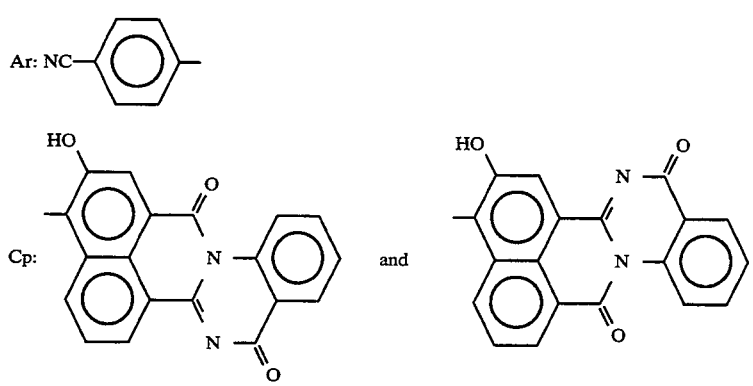

Comparative pigment 2

-continued
Basic formula: Ar—N=N—Cp
Ar: 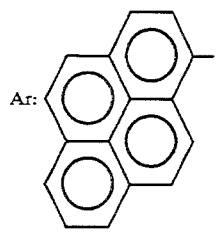
Cp: 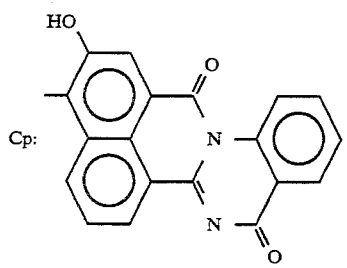 and 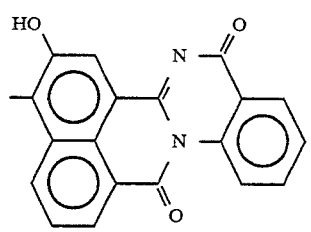
Comparative pigment 3
Ar: 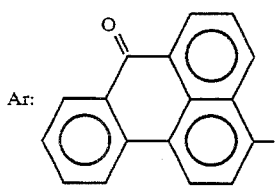
Cp: 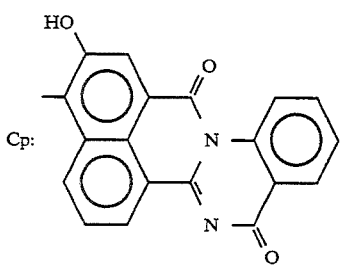 and 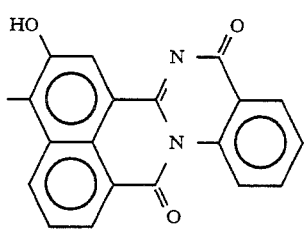
Comparative pigment 4
Ar: 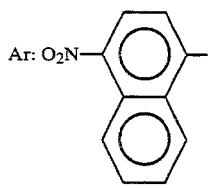
Cp: 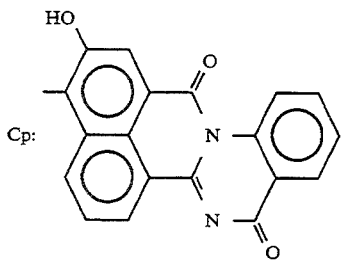 and 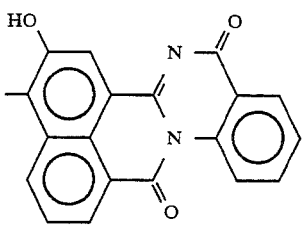
Comparative pigment 5

-continued

Basic formula: Ar—N=N—Cp

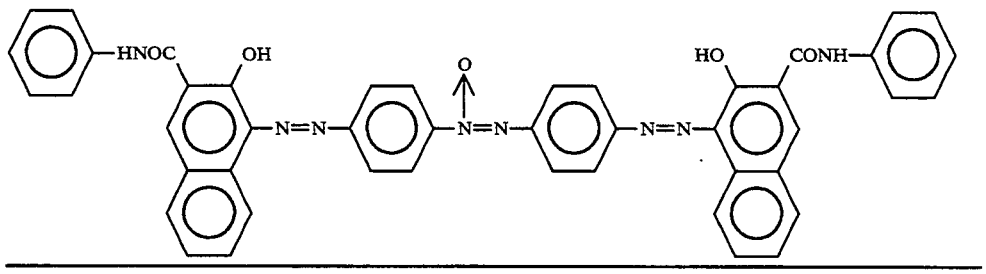

TABLE 2

| Comparative example | Comparative pigment No. | $V_0$ (−V) | $E_{\frac{1}{2}}$ (lux · sec) |
|---|---|---|---|
| 1 | 1 | 685 | 10.5 |
| 2 | 2 | 695 | 8.5 |
| 3 | 3 | 680 | 8.5 |
| 4 | 4 | 720 | 10.9 |
| 5 | 5 | 710 | 6.0 |

Examples 27 to 31

The electrophotographic photosensitive member produced in Example 1 was stuck on a cylinder of an electrophotographic copying machine equipped with a corona charger of −6.5 kV, an exposure optical system, a developing assembly, a transfer charger, a charge elimination exposure optical system and a cleaner. Its dark portion potential $V_D$ and light portion potential $V_L$ at the initial stage were set to be approximately −700 V and −200 V, respectively. Thereafter, the photosensitive member was repeatedly used 5,000 times. At the initial stage and after the repeated use, the amount of variation of dark portion potential $\Delta V_D$ and the amount of variation of light portion potential $\Delta V_L$ were measured to evaluate durability. The same evaluation was also made on the electrophotographic photosensitive members produced in Examples 2, 3, 4 and 8.

Results obtained are shown in Table 3. In the table, the minus sign in the amount of variation of potential represents a decrease in the absolute value of the potential, and the positive sign represents an increase in the absolute value of the potential.

TABLE 3

| Example | Pigment No. | $\Delta V_D$ (V) | $\Delta V_L$ (V) |
|---|---|---|---|
| 27 | 1 | −20 | −5 |
| 28 | 2 | −10 | +10 |
| 29 | 3 | −10 | +20 |
| 30 | 4 | +10 | +15 |
| 31 | 8 | −10 | −10 |

Comparative Example 6

Using the electrophotographic photosensitive member produced in Comparative Example 5, the amount of variation of potential was measured in the same manner as in Example 27 after it was repeatedly used.

Results obtained are shown below.

$\Delta V_D$: −55 V $\Delta V_L$: +60 V

AS is seen from the above results, the electrophotographic photosensitive members according to the present invention cause only very small potential variations when repeatedly used.

Example 32

A subbing layer comprising polyvinyl alcohol was formed in a coating thickness of 0.5 μm on the aluminum surface of an aluminum-deposited polyethylene terephthalate film. A dispersion of an azo pigment, prepared in the same manner as in Example 1 was applied onto the subbing layer, followed by drying to form a charge generation layer of 0.2 μm in coating thickness.

Next, a solution prepared by dissolving 5 g of a styryl compound represented by the formula:

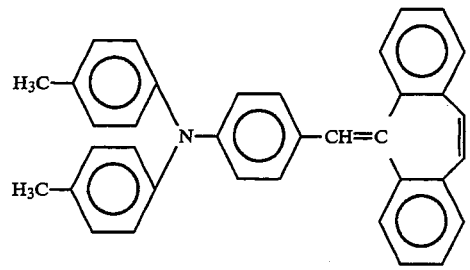

and 5 g of polycarbonate (weight average molecular weight: 55,000) in 40 g of tetrahydrofuran was applied onto the charge generation layer, followed by drying to form a charge transport layer of 20 μm in coating thickness. An electrophotographic photosensitive member was thus produced. The charge characteristics and durability of the electrophotographic photosensitive member produced were evaluated in the same manners as in Examples 1 and 27.

Results obtained are shown below.

$V_0$: −705 V $E_{\frac{1}{2}}$: 1.9 lux.sec $\Delta V_D$: 0 V $\Delta V_L$: +5 V

Example 33

An electrophotographic photosensitive member was produced except that the charge generation layer and the charge transport layer were formed in the reverse order, and the charge characteristics were evaluated in the same manner as in Example 1.

Results obtained are shown below.

Here, the photosensitive member was positively charged.

$V_0$: +685 V $E_{\frac{1}{2}}$: 2.5 lux.sec

Example 34

Onto the charge generation layer prepared in Example 1, a solution prepared by dissolving 5 g of 2,4,7-trinitro-9-fluorenone and 5 g of poly-4,4'-dioxydiphenyl-2,2-propane carbonate (weight average molecular weight: 30,000) in 50 g of tetrahydrofuran was applied by Meyer bar coating to form a charge transport layer having a dried coating thickness of 18 μm. An electrophotographic photosensitive member was thus produced. The charge characteristics of the electrophotographic photosensitive member produced were measured in the same manner as in Example 1.

Results obtained are shown below.

Here, the photosensitive member was positively charged.

$V_0$: +680 V $E_{\frac{1}{2}}$: 6.8 lux.sec

Example 35

Using a paint shaker, 0.5 g of pigment 1 was dispersed for 5 hours together with 9.5 g of cyclohexanone. A solution obtained by dissolving 5 g of the same charge-transporting material as used in Example 1 and 5 g of polycarbonate in 40 g of tetrahydrofuran was added thereto, followed by shaking for further 1 hour. A coating solution thus prepared was applied to an aluminum support by Meyer bar coating to form a photosensitive layer of 20 μm in coating thickness.

The charge characteristics of the electrophotographic photosensitive member thus produced were evaluated in the same manner as in Example 1.

Results obtained are shown below.

Here, the photosensitive member was positively charged.

$V_0$: +690 V $E_{\frac{1}{2}}$: 3.6 lux.sec

As described above, the electrophotographic photosensitive member of the present invention employs in its photosensitive layer the azo pigment having the specific structure, and hence brings about an improvement of any one or both of the generation efficiency and injection efficiency of charge carries in the interior of the photosensitive layer, so that the photosensitive member is remarkably effective for achieving superior characteristics in the sensitivity and the potential stability during its repeated use. The same remarkable effect can also be achieved in the electrophotographic apparatus, device unit and facsimile machine having such an electrophotographic photosensitive member.

What is claimed is:

1. An electrophotographic photosensitive member comprising a conductive support and a photosensitive layer provided thereon, wherein said photosensitive layer contains an azo pigment represented by the following Formula (1), Formula (1):

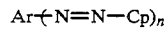

wherein Ar represents a substituted or unsubstituted aromatic hydrocarbon group which may be bonded through a linking group, or a substituted or unsubstituted heterocyclic group which may be bonded through a linking group; Cp represents a coupler residual group having a phenolic hydroxyl group, at least one of said Cp representing a coupler residual group represented by the following Formula (2); and n represents an integer of 2 to 4, Formula (2):

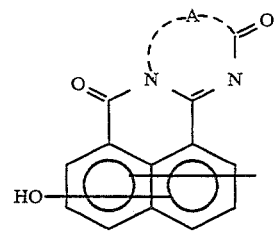

wherein A represents a divalent group of a substituted or unsubstituted aromatic hydrocarbon ring or a divalent group of a substituted or unsubstituted heterocyclic ring containing a nitrogen atom in the ring.

2. An electrophotographic photosensitive member according to claim 1, wherein all Cp's are groups represented by Formula (2).

3. An electrophotographic photosensitive member according to claim 1, wherein said photosensitive layer contains as a charge-generating material the compound represented by Formula (1).

4. An electrophotographic photosensitive member according to claim 1, wherein said photosensitive layer has a charge generation layer and a charge transport layer.

5. An electrophotographic photosensitive member according to claim 4, wherein said electrophotographic photosensitive member has the charge generation layer on the conductive support and has the charge transport layer on said charge generation layer.

6. An electrophotographic photosensitive member according to claim 4, wherein said electrophotographic photosensitive member has the charge transport layer on the conductive support and has the charge generation layer on said charge transport layer.

7. An electrophotographic photosensitive member according to claim 1, wherein said photosensitive layer is comprised of a single layer.

8. An electrophotographic photosensitive member according to claim 1, wherein said electrophotographic photosensitive member has a subbing layer between the conductive support and the photosensitive layer.

9. An electrophotographic photosensitive member according to claim 1, wherein said electrophotographic photosensitive member has a protective layer on the photosensitive layer.

10. An electrophotographic apparatus comprising an electrophotographic photosensitive member, a means for forming an electrostatic latent image, a developing means for developing the electrostatic latent image formed and a transfer means for transferring the developed image to a transfer medium;

said electrophotographic photosensitive member comprising a conductive support and a photosensitive layer provided thereon, wherein said photosensitive layer contains an azo pigment represented by the following Formula (1), Formula (1):

wherein Ar represents a substituted or unsubstituted aromatic hydrocarbon group which may be bonded through a linking group, or a substituted or unsubstituted heterocyclic group which may be bonded through a linking group; Cp represents a coupler residual group having a phenolic hydroxyl group, at least one of said Cp representing a coupler residual group represented by the following Formula (2); and n represents an integer of 2 to 4.

Formula (2):

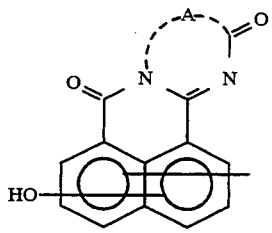

wherein A represents a divalent group of a substituted or unsubstituted aromatic hydrocarbon ring or a divalent group of a substituted or unsubstituted heterocyclic ring containing a nitrogen atom in the ring.

11. An electrophotographic apparatus according to claim 10, wherein all Cp's are groups represented by Formula (2).

* * * * *

UNITED STATES PATENT AND TRADEMARK OFFICE
CERTIFICATE OF CORRECTION

PATENT NO. : 5,411,828
DATED : May 2, 1995
INVENTOR(S) : YOSHIO KASHIZAKI

It is certified that error appears in the above-identified patent and that said Letters Patent is hereby corrected as shown below:

COLUMN 1

Line 65, "a" should read --an--.

COLUMN 2

Line 37, "4;" should read --4.--.

Line 41, " 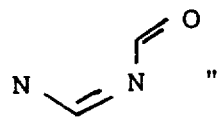 should read -- 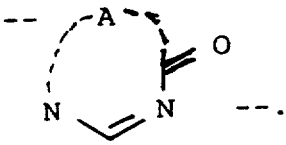 --.

Line 51, "e" should read --a--.
   Line 56, "e" should read --a-- and "end" should read --and--.

COLUMN 3

Line 48, "N-methyldiphenylamide," should read
           --N-methyldiphenylamine,--.

COLUMN 30

Line 38, "fistly" should read --firstly--.

COLUMN 31

Line 54, "includes" should read --include--.

COLUMN 32

Line 38, "polycarbontes," should read --polycarbonates,--.

UNITED STATES PATENT AND TRADEMARK OFFICE
CERTIFICATE OF CORRECTION

PATENT NO. : 5,411,828
DATED : May 2, 1995
INVENTOR(S) : YOSHIO KASHIZAKI

It is certified that error appears in the above-identified patent and that said Letters Patent is hereby corrected as shown below:

COLUMN 34

Line 30, "Irradiation" should read --irradiation--.

COLUMN 35

Line 32, "An" should read --in--.

COLUMN 40

Line 16, "AS" should read --As--.

Signed and Sealed this

Seventeenth Day of October, 1995

Attest:

BRUCE LEHMAN

Attesting Officer    Commissioner of Patents and Trademarks